May 14, 1957     G. E. MOORE ET AL     2,791,883
PROPELLANT SYSTEM
Filed Oct. 25, 1951
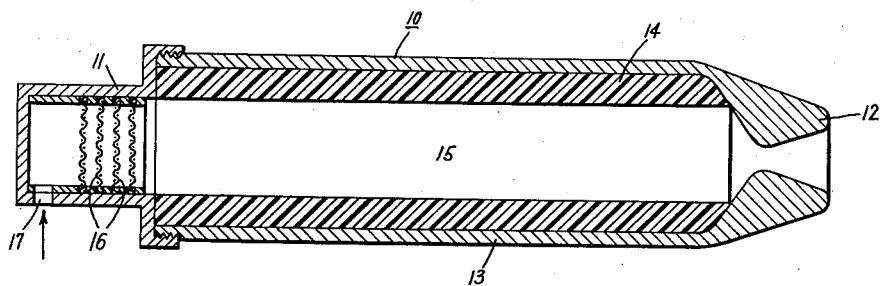
Inventors:
George E. Moore,
Fredric M. Cooper,
by Paul G. Frank
Their Attorney.

United States Patent Office 2,791,883
Patented May 14, 1957

2,791,883
PROPELLANT SYSTEM

George E. Moore, Scotia, and Fredric M. Cooper, Albany, N. Y., assignors to General Electric Company, a corporation of New York Application October 25, 1951, Serial No. 253,116

9 Claims. (Cl. 60—35.6)

This invention relates to a method and apparatus for rocket propulsion. More particularly, it relates to a method and apparatus for rocket propulsion employing hydrogen peroxide as a source of oxygen and a solid organic substance as the fuel.

During the history of rocket development much effort has been devoted toward improving the efficiency of propulsion systems and means for controlling the operation thereof. Recent years have seen the development of liquid fuels such as hydrocarbons and alcohol which are provided with oxygen from a source such as hydrogen peroxide or liquid oxygen. Since the fuel and oxygen are both initially present in liquid form, the control apparatus for bringing the two fluids together in a combustion chamber must necessarily be positive in operation and sensitive to changes in the system. Both of these requirements make for complicated and expensive apparatus. Even so, there is always the danger of an explosion due to failure of the control apparatus allowing an over-concentration of volatile fluids in the combustion chamber. Accordingly, it is an object of this invention to provide a rocket propulsion system which is easily controlled.

Another object of the invention is to provide a rocket propulsion system in which control of combustion is achieved by the nature of the combusting substances themselves.

A further object of the invention is to provide a rocket propulsion system in which a solid fuel charge is ignited by contact with hot oxidizing gases.

Briefly stated, in accordance with one aspect of our invention we place a solid organic substance, such as polyethylene, provided with a central passageway or a member of such passageways therethrough in the fuel chamber of a rocket with the central passageways lined up with the direction of desired gas flow toward the nozzle. Near one end of the passageway we provide a chamber for decomposing hydrogen peroxide. In this chamber we contact hydrogen peroxide with a decomposition catalyst such as silver, an action which breaks the hydrogen peroxide down into steam and oxygen at about 700° C. which temperature may be a little higher or lower depending upon the concentration of the hydrogen peroxide. We then direct these hot decomposition products into the passageway where they contact the solid organic material and ignite it. The resulting combustion is utilized as the driving force of the vehicle.

The accompanying diagrammatic drawing, which illustrates one embodiment of our invention, shows in cross section the tail portion of a rocket engine constructed in accordance with our invention. The left side of the figure illustrated constitutes the forward portion of a propulsion element. Where the engine is utilized in a rocket a head (not shown) containing scientific instruments and a supply tank of hydrogen peroxide is attached to the forward portion of the propulsion element. The engine may also be attached to vehicles other than rockets.

The propulsion element illustrated consists of a casing 10 having a forward portion 11, a nozzle 12 and a central portion 13. The forward portion 11 houses the decomposing chamber for hydrogen peroxide; the nozzle 12 serves as an outlet for the combustion products; and the central portion 13 encloses a fuel chamber. Steel is a satisfactory material of construction for the casing 10 but many other metals will also give satisfactory service.

The fuel chamber contains a charge 14 of solid organic combustible material. In the embodiment shown the charge 14 has its outer surface adapted to conform with the inner surface of the casing 10. Normally, this is cylindrical but it need not be so. Passing through the charge 14 is a longitudinal passageway 15. This passageway 15 may conveniently be cylindrical in configuration but may also have other shapes to control the gas flow pattern. There may also be a number of such passageways.

The hydrogen peroxide decomposing chamber may be equipped with either a plurality of screens 16 composed of, or coated with, a hydrogen peroxide decomposition catalyst such as silver, copper, iridium, or a number of other metals or some other solid catalyst such as manganese dioxide supported on a ceramic. Hydrogen peroxide is introduced to the decomposition chamber through an aperture 17. Very quickly thereafter it contacts the catalyst screens 16 and decomposes to steam and oxygen. The temperature of the decomposition products depends upon the concentration of the hydrogen peroxide. For a concentration of 100 percent hydrogen peroxide, this temperature is about 930° C., for 90 percent hydrogen peroxide it is about 740° C., and for 80 percent it is about 500° C. Concentrations of 80 percent or even lower are satisfactory for the purposes of this invention but as the concentration decreases ignition does not take place so quickly.

The hot decomposition products of the hydrogen peroxide pass at once into the fuel chamber via the passageway 15. Here these hot gases contact the fuel charge 14 which is ignited. The combustion products then pass through the nozzle 12, their energy thus being utilized to propel the rocket or other device to which the engine is attached.

By contacting the fuel charge 14 with a hot vapor containing oxygen, we not only provide for the rapid ignition of the fuel charge but also provide a safe means for operating a rocket engine. Since only a limited surface of the solid fuel 14 can be in contact with the combustion supporting gases at any one time and because the oxidizing gas is of low density in the chamber, it is obvious that over-concentration of the propellants is almost impossible. The solid fuel 14 may be of any type which contains carbon and hydrogen in sufficient quantities for it to be easily combustible. It is also desirable that the material be easily workable in order that charges of different shapes may be placed in the fuel chamber. In order to obtain the greatest thrust with the least weight of fuel, we have found that hydrocarbons, particularly those with a hydrogen-carbon ration of the order of 2 to 1, give excellent results. Polymerized ethylene of the type commonly available on the market having a molecular weight of between 16,000 and 24,000 is a very satisfactory fuel. Petroleum hydrocarbons, such as paraffin wax melting at about 60° C., have also given satisfactory results. Polysulfide rubbers and butyl rubbers are easily workable and will also give good results. Mixtures of the above substances with other solid organic fuels perform satisfactorily. Additives such as calcium carbide and lithium hydride may be incorporated in the fuels as can oxidizers such as sodium nitrate and organic nitrates.

With a fuel having a hydrogen-carbon ratio of the order of 2 to 1, we find that best results are obtained using hydrogen peroxide in the proportion of 7 parts by weight of hydrogen peroxide to 1 part by weight of fuel. With fuels having a lower hydrogen-carbon ratio, the proportion of hydrogen peroxide may be cut down somewhat.

When a hot oxidizing gas makes contact with the solid fuel 14, the ignition takes place smoothly and promptly. We have found under these circumstances that combustion takes place from the entire surface of the passageway at a uniform rate.

A simple control of the hydrogen peroxide feed is all that is necessary in order to control the combustion. This fact makes our propulsion system especially adaptable to aircraft take-off assistance or sustained aircraft propulsion where intermittent operation may be desired.

While the present invention has been described by reference to a particular embodiment thereof, it will be understood that numerous modifications may be made by those skilled in the art without actually departing from the invention. We, therefore, aim in the appended claims to cover all such equipment variations as come within the true spirit and scope of the foregoing disclosure.

What we claim as new and desire to secure by Letters Patent of the United States is:

1. In a rocket propulsion system a fuel chamber, a solid fuel having a longitudinal passageway therethrough positioned in said chamber, a hydrogen peroxide decomposer chamber, means for introducing hydrogen peroxide to said decomposer chamber, means in said decomposer chamber for decomposing hydrogen peroxide, and means for contacting said solid fuel with the decomposition products of said hydrogen peroxide.

2. A rocket propulsion system as claimed in claim 1 in which the solid fuel charge is a hydrocarbon.

3. A rocket propulsion system as claimed in claim 1 in which the fuel charge has a hydrogen-carbon ratio of the order of 2 to 1.

4. A rocket propulsion system as claimed in claim 1 in which the fuel charge is polymerized ethylene.

5. A rocket propulsion system as claimed in claim 1 in which the fuel charge is a paraffin wax.

6. A rocket propulsion system as claimed in claim 1 in which the fuel charge is a polysulfide rubber.

7. A rocket propulsion system as claimed in claim 1 in which the fuel charge is butyl rubber.

8. A rocket propulsion system as claimed in claim 1 in which the fuel charge contains a nitrate oxidizer.

9. In a rocket propulsion system, a fuel chamber, a solid fuel defining a longitudinal passageway positioned in said chamber, a hydrogen peroxide decomposer chamber, means for introducing hydrogen peroxide to said decomposer chamber, a screen coated with hydrogen peroxide decomposition catalyst in said chamber, and means for contacting said solid fuel with the decomposition products of said hydrogen peroxide.

References Cited in the file of this patent

UNITED STATES PATENTS

| | | |
|---|---|---|
| 929,503 | Selden | July 27, 1909 |
| 1,532,930 | O'Neill | Apr. 7, 1925 |
| 2,325,618 | Lysholm | Aug. 3, 1943 |